US011000150B2

(12) United States Patent
Thies et al.

(10) Patent No.: US 11,000,150 B2
(45) Date of Patent: May 11, 2021

(54) DEVICE FOR AT LEAST PARTIALLY CLOSING AN OPENING OF A COOKING VESSEL, COOKING VESSEL SYSTEM AND KITCHEN MACHINE

(71) Applicant: Vorwerk & Co. Interholding GmbH, Wuppertal (DE)

(72) Inventors: Felix Thies, Wuppertal (DE); Matthias Varnhorst, Wuppertal (DE); Jutta Schomacher, Velbert (DE); Michael Sickert, Ennepetal (DE)

(73) Assignee: Vorwerk & Co. Interholding GmbH, Wuppertai (DE)

( * ) Notice: Subject to any disclaimer, the term of this patent is extended or adjusted under 35 U.S.C. 154(b) by 108 days.

(21) Appl. No.: 16/256,976

(22) Filed: Jan. 24, 2019

(65) Prior Publication Data

US 2019/0239681 A1   Aug. 8, 2019

(30) Foreign Application Priority Data

Jan. 24, 2018   (EP) ..................... 18153303

(51) Int. Cl.
*A47J 36/06*   (2006.01)
*A47J 43/27*   (2006.01)
(Continued)

(52) U.S. Cl.
CPC .............. *A47J 36/06* (2013.01); *A47J 36/34* (2013.01); *A47J 36/38* (2013.01); *A47J 43/27* (2013.01)

(58) Field of Classification Search
CPC .. A47J 36/06; A47J 43/27; A47J 36/34; A47J 36/38; A47J 36/10; A47J 43/0716
See application file for complete search history.

(56) References Cited

U.S. PATENT DOCUMENTS 4,267,941 A * 5/1981 Loudin ................ B65D 39/084
                                                                                      220/293
4,819,829 A * 4/1989 Rosten ................... B65D 5/727
                                                                                    220/254.9
(Continued)

FOREIGN PATENT DOCUMENTS

DE      102010017387 A1    12/2011
DE      102014100967 A1     2/2015
(Continued)

OTHER PUBLICATIONS

English translation of DE-102014111216-A1 provided by Espacenet. (Year: 2020).*
(Continued)

*Primary Examiner* — James N Smalley
(74) *Attorney, Agent, or Firm* — Intellectual Property Law Group LLP

(57) ABSTRACT

The invention relates to a device (10) for at least partially closing an opening (5) of a cooking vessel (2), having a support element (11) which can be brought to rest on an opening edge (6) of the opening (5) of the cooking vessel (2), and a plug-in element (12) which can be inserted at least partially through the opening (5), characterized in that the plug-in element (12) has a locking means (13) which can be brought into a locking position (I) in which the locking means (13) interacts with the opening edge (6), so that pulling out (205) of the plug-in element (12) is prevented.

19 Claims, 4 Drawing Sheets

(51) Int. Cl.
*A47J 36/34* (2006.01)
*A47J 36/38* (2006.01)

(56) References Cited

U.S. PATENT DOCUMENTS

| | | | | |
|---|---|---|---|---|
| 7,950,542 B2 * | 5/2011 | Steadman | ............ | B65D 17/506 |
| | | | | 220/294 |
| 2008/0302753 A1 * | 12/2008 | Jochem | .............. | B65D 41/0485 |
| | | | | 215/228 |
| 2016/0287018 A1 * | 10/2016 | Thomas | ................ | A47J 43/046 |

FOREIGN PATENT DOCUMENTS

| | | | | |
|---|---|---|---|---|
| DE | 102014111216 A1 * | 2/2016 | .......... | A47J 43/0716 |
| EP | 2 526 842 A1 | 11/2012 | | |
| EP | 3420864 A1 * | 1/2019 | ............. | A47J 36/06 |
| WO | WO 2015/074720 A1 | 5/2015 | | |

OTHER PUBLICATIONS

European Search Report, dated Apr. 24, 2018 corresponding European Application No. 18 153 303.5.

* cited by examiner

DEVICE FOR AT LEAST PARTIALLY CLOSING AN OPENING OF A COOKING VESSEL, COOKING VESSEL SYSTEM AND KITCHEN MACHINE

CROSS-REFERENCE TO RELATED APPLICATIONS

This application claims priority to European application no. 18 153 303.5 filed on Jan. 24, 2018, which is hereby incorporated by reference in its entirety.

BACKGROUND OF THE INVENTION

1. Field of the Invention

The invention relates to a device for at least partially closing an opening of a cooking vessel, a cooking vessel and a food processor.

2. Background

State-of-the-art cooking vessels are known which have a lid to contain heat and/or pressure in the cooking vessel. However, it is often a disadvantage that the cooking vessel either has to be completely closed or the lid has to be completely removed. Alternatively, in such cases a user often only has the option of placing the lid at an angle to the cooking vessel, but an opening gap is imprecise and splashing of liquid is not prevented.

In particular with automatically or semi-automatically operable kitchen machines, however, it is desirable to standardize a cooking result and thus also to maintain the pressure and heat conditions within the cooking vessel as defined as possible. From the state of the art it is therefore known, for example from DE 10 2014 100 967 A1 and DE 10 2010 017 387 A1, that a lid for a cooking vessel of a food processor is provided with an opening on which a closure element can be placed so that part of the opening is closed and at the same time steam, i.e. in particular heat and/or pressure, can escape from the cooking vessel.

Under certain pressure and/or heat conditions, the closure element may lift off from the cooking vessel, which may result in an audible noise that can be perceived negatively by the user. It is also desirable to protect the opening from inadvertent removal of the closure element to ensure the required environmental conditions within the cooking vessel during cooking.

SUMMARY

It is an object of the present invention to eliminate at least some of the previously known disadvantages from the state of the art. In particular, it is an object of the present invention to improve an at least partial closure of an opening in a cooking vessel, particularly in a food processor, during the cooking process.

The above object is solved by a device with the characteristics of claim 1, a cooking vessel system with the characteristics of claim 14 and a food processor with the characteristics of claim 15.

Further characteristics and details of the invention result from the dependent claims, the description and the drawings. Characteristics and details which have been described in connection with the device conforming to the invention naturally also apply in connection with the cooking vessel system conforming to the invention and/or the food processor conforming to the invention and vice versa, so that with regard to the disclosure of the individual aspects of the invention, mutual reference is or can always be made.

In accordance with the invention, the device for at least partially closing an opening of a cooking vessel has a support element which can be brought to rest on an opening edge of the opening of the cooking vessel. Furthermore, the device has a plug-in element which can be inserted at least partially through the opening. The plug-in element also has a locking means which can be brought into a locking position in which the locking means interacts with the opening edge to prevent the plug-in element from being pulled out.

In particular, the locking device can thus be positioned at the opening edge in such a way that pulling the plug-in element out of the opening is prevented. Preferably, a positive and/or a frictional connection can therefore be produced in the locking position by the locking agent. In the context of the invention, the fact that the plug-in element is prevented from being pulled out in the locking position can preferably be understood to mean that the device is removed from the cooking vessel vertically, i.e. parallel to a central axis of the opening. This means that the support element can advantageously be used to ensure that the device can be positioned on the opening edge and does not fall through the opening. The blocking agent can act in the opposite direction to the support element so that the device can only be removed from the cooking vessel under certain conditions.

The plug-in element may preferably have a section connecting the support element and the locking means. In particular, the opening and/or the plug-in element may be cylindrical in shape in order to ensure an even closure of at least part of the opening. A positive locking of the locking means with the opening edge is conceivable, for example, by a bayonet lock, wherein recesses through which the locking means can be inserted are provided on at least one side, preferably on two sides, of the opening, so that the locking means can be positioned below the opening edge upon rotation of the plug-in element and/or the device. Furthermore, it is conceivable that the form closure can be achieved by tilting the device.

The fact that the plug-in element has the locking means enables to close the opening at least partially, so that, for example, only a defined area or no area at all is permeable to steam, and at the same time to secure the device at the edge of the opening. This may, for example, prevent a user from unintentionally removing the device if, for example, the user bumps into the device. Furthermore, in the case of an overpressure in the cooking vessel, the blocking means may cause the device not to move or only to move in a specific range, in particular in order to release the overpressure. At the same time, a splash guard can be maintained by the device so that the contents of the cooking vessel do not leave the device uncontrolled even in the event of overpressure.

In the case of a device according to the invention, it is also conceivable that, in the locking position, the support element can be brought to rest on a first side of the opening edge and, in the locking position, the locking means can be positioned on a second side of the opening edge, so that the plug-in element with the locking means and the support element engage at least partially around the opening edge. Preferably, the plug-in element with the blocking agent and the support element can only partially grasp the opening edge, so that steam can escape from the cooking vessel to the side of the blocking agent. In particular, the device can thus be configured to only partially close the opening of the cooking vessel. By gripping the device around the edge of the opening, a positive locking can be easily achieved in order to achieve a fastening effect by means of a positive locking. In the locking position, the plug-in element may preferably be arranged centrally, i.e. in particular centered, in the opening in order to enable the locking effect of the locking agent. In the context of the invention, it can also be understood that the plug element with the locking means and the support element at least partially surround the opening edge in such a way that the locking means and the support element are each in contact with the opening edge from one side or that only the support element or the locking means is in contact with the opening edge in the locking position. It is conceivable, for example, that when the support element rests on the opening edge, a clearance, i.e. a distance between the blocking means and the opening edge, is provided within which the device can move along a central axis of the opening, in particular to be able to react to changing pressure conditions within the cooking vessel. This means that a defined cooking result can be achieved at the same time by gripping the plug-in element with the locking device and the support element around the opening edge. In particular, the locking means may have at least one locking element, preferably in the form of a locking hook, which, in the locking position, can engage behind the opening edge and thereby prevent the plug-in element from being pulled out of the opening, in particular by positive locking. The locking element, in particular each locking element, may advantageously have a length of less than 5 mm, preferably less than 4 mm, preferably less than 2 mm.

In the context of the invention it is further conceivable that in the blocking position a free space is formed at least in regions around the plug-in element, in particular between the blocking means and the support element, whereby the plug-in element can be moved in the direction of the opening edge, so that the blocking means can be brought into a release position in which the blocking means can be released or released at least partially from the opening edge. Thus the plug-in element can have a circumferential area, which in particular can form part of the outer wall of the device. The circumferential area may also have a smaller diameter than the opening so that the clearance is at least partially maintained even when the device is inserted into the opening. The free space can thus also be described as a bulge or recess. The free space allows the plug-in element to move within the opening, which can be used in particular by a user of the device to move the device between the blocking position and the release position. The free space can thus enable the opening edge to engage in the free space in the release position, so that the device is positioned in the opening opposite the free space in such a way that it can be brought into a position, for example by a tilting movement, in which it is possible to pull the plug-in element out of the opening. Accordingly, the free space can be used to insert the device into the opening by means of a tilting movement. This results in a simple, intuitive operation of the device, which at the same time enables a fastening which prevents the pulling out of the opening of the plug-in element.

It is advantageous that at least one positioning means can be provided on the plug-in element of a device in accordance with the invention, by means of which the plug-in element can be centered in the opening. Preferably two, three or four positioning means can be provided. The at least one positioning means may advantageously be ribbed so that steam can escape from the cooking vessel laterally of the at least one positioning means, while the at least one positioning means in the blocking position can preferably be brought into contact with the opening edge. In particular, the at least one positioning means can be elastically deformable so that when the plug-in element moves in the direction of the opening edge, the positioning means deflects in and automatically allows centering in the opening if, for example, a user does not apply an external force to the device. By means of at least one positioning means, a uniform steam outlet between the plug-in element and the opening edge can thus be achieved in a defined manner and at the same time a reliable positioning of the device or the blocking element in the blocking position can be achieved.

Preferably, the support element of a device conforming to the invention may have a collar which completely encloses the plug-in element. The collar can thus provide a splash guard which prevents uncontrolled spraying of ingredients and/or foodstuff from the opening of the cooking vessel, at least in the blocking position. At the same time, the collar makes it easy to realize the function of the support element for resting on the opening edge, so that the collar can fulfil several functions. This can result in a particularly simple design of the device, so that the manufacturing costs can be low.

It is also conceivable that, in a device according to the invention, the support element has a stand-on-device with which the support element can be brought to rest on the edge of the opening. Preferably, the stand-on-device may have at least one interruption, the support element being at a distance from the opening edge in the region of the interruption when it is resting on the opening edge. The stand-on-device may also preferably be located on the collar, in particular on the outer diameter of the collar, and/or have a height of less than 5 mm, preferably less than 4 mm. In addition, it is advantageous for the stand-on-device to have at least partially a cross-section tapering towards the contact surface, so that even on an inclined surface the risk of tipping is reduced and a defined standing is ensured. The stand-on-device may preferably be made of an elastic material, in particular to improve acoustics when the stand-on-device vibrates. The interruption of the stand-on-device may also allow steam to escape past the stand-on-device if the stand-on-device rests on the opening edge. At the same time, the interruption may result in a defined steam outlet based on the interruption width of the interruption.

In the case of a device in accordance with the invention, it may also be provided that a functional element extends from the support element, which can be grasped by a user when the support element rests on the edge of the opening. Thus, the functional element can comprise a handle, which in particular projects from the support element or extends parallel or substantially parallel to the support element, so that a recess in the handle can be engaged in order to remove the device, e.g. from the cooking vessel. In addition or alternatively, the functional element can include a wall which the user can grasp to remove the device from the cooking vessel. The wall may preferably allow further functions of the device.

The invention may also provide for a first material and a second material. Preferably, the first material may have a lower hardness than the second material and/or the support element may have the first material and the functional element the second material. In particular, the first and/or the second material, in particular each, may comprise a plastics material. The hardness of the first and/or second material can preferably be understood as a Shore hardness. In particular, the device can thus be configured as a 2K plastic injection-molded part. On the one hand this can result in low manufacturing costs and on the other hand two materials can be combined advantageously. For example, it is conceivable that the first and second materials differ in their temperature coefficients, so that, for example, the first material has a higher thermal diffusivity than the second material. Thus, the functional element, for example, can still be within the reach of a user at a comfortable temperature even when the device is exposed to heat. If the first material has a lower hardness than the second material, it is also possible that, for example, the first material has a sound-absorbing effect, while the second material may have a higher resistance to environmental influences. This can, for example, increase the service life of the functional element with the second material, while at the same time providing advantageous characteristics of the device in terms of acoustic properties during the operation of the cooking vessel, i.e. in particular during a cooking process. Preferably those sections of the device which can be brought into contact with the opening edge when the device is used as intended may have the first material.

It is also conceivable that a device which is in keeping with the invention may be equipped with a surface with which the device can be placed away from the cooking vessel. Preferably, the plug-in element can have the storage space and/or the storage space can have anti-slip protection. The surface can provide a defined position for the device when the device is placed away from the cooking vessel, e.g. next to the cooking vessel. This allows, for example, a defined placement of the device in a kitchen shelf, so that a positive impression of a user of the device can be promoted. In particular, the floor space may simultaneously close an area of the opening in the locked position. In particular, the storage space can form an end area of the plug-in element. The anti-slip protection, which can be provided as a circumferential soft component and/or made of the first material, for example, can also improve the stability of the device away from the cooking vessel. In particular, the storage space can be particularly advantageous if the device can be filled at least partially.

In the context of the invention, it is also conceivable that a steam path can be formed when the support element rests on the opening edge by at least one positioning means and/or by the interruption with the opening edge. The plug-in element and/or the collar may preferably be arranged at a distance from the edge of the opening by at least one positioning means and/or by the stand-on-device. The steam path can thus be defined by the formation of the steam path, in particular so that cooking conditions within the cooking vessel can be standardized or defined. Thus, it can be determined in advance which cooking effect can be achieved at which temperature and/or pressure conditions within the cooking vessel. Furthermore, the steam path can be used to provide a minimum exchange of foodstuff and/or ingredient storage space within the cooking vessel with the environment, preferably without the need to lift a splash guard. Preferably the steam can therefore leave the cooking vessel, in particular through the free space, past the positioning means, through the interruption, while the device at least partially closes the opening. This can result in a combination of the most diverse functions of the aforementioned components, which together enable the steam path and thus improve the overall cooking experience for the user.

In the case of a device conforming to the invention, it is also conceivable that the plug-in element and/or the functional element form a cavity which can be filled with an ingredient. The cavity may also preferably have a chute through which the ingredient can be poured from the cavity and/or the cavity may preferably have a level indicator. The chute may preferably be arranged in relation to the interruption or interruptions in such a way that the chute is a visible indicator to a user of a steam outlet direction in which steam can escape from the opening below the support element. The cavity can thus be understood as a vessel space which can be filled with the ingredient. The level indicator may preferably include a label and/or a set-off interior of the cavity through which a user can deduce a quantity of ingredients filled into the cavity. For example, the lettering can include a milliliter specification or the offset interior can indicate a milliliter specification. Preferably, a measuring cup is integrated into the device. Thus, further advantageous functions can be realized by the plug-in element and/or the functional element. In particular, the measuring cup characteristics in the device may provide a high level of user comfort, in particular since the device is located in the vicinity of the cooking vessel anyway and can be easily removed during the cooking process, so that the opening simultaneously allows access to the cooking vessel, which in particular can be restricted at the same time. For example, restricted access may mean that the opening is only a small diameter through which a user cannot easily reach with his hand. This may increase the safety of the food processor and/or the cooking vessel.

Preferably, in a device according to the invention, the cavity can project at least partially into the plug-in element, in particular wherein the cavity on the plug-in element has a first diameter and on the functional element a second diameter, wherein the first diameter is smaller than the second diameter. This means that a separate interior can be created which can also be used as a fill level indicator. In addition, the already existing installation space of the plug-in element can be used to form the cavity and thus enable, for example, a measuring cup characteristic of the device. If the second diameter on the functional element is also larger than the first diameter on the plug-in element, the installation space of the device can also be optimized, since, for example, the functional element can be arranged on the support element, which preferably also has a larger diameter than the plug-in element, in order to enable it to rest on the opening edge.

Within the scope of the invention, the device is preferably configured as a measuring cup. Thus the device can also be called a measuring cup, whereby the device simultaneously enables the function of a closing element of the cooking vessel. This results in a variety of advantageous functions for a user in a single component, so that the user, for example, can do without a separate measuring cup and thus save space in the kitchen cupboard, for example.

According to another aspect of the invention, a cooking vessel system is claimed. The cooking vessel system has a cooking vessel for the reception of ingredients. A device in accordance with the invention is provided through which an opening of the cooking vessel in a blocking position can be at least partially closed or at least partially closed.

The opening may preferably be provided in a cover element of a receptacle of the cooking vessel. Preferably, foodstuff can be heated in the recording room, so that the recording room can also be referred to as the cooking room. The cover element may be provided in one piece with a wall of the receiving space or at least partially form the wall of the receiving space. Alternatively, the cover element can be part of a separate cover component, by means of which the cooking vessel or the receptacle can be partially closed. Preferably the cover component can have the opening. This may allow the cooking vessel to be opened completely, preferably on the top side, when the lid component is removed. At the same time it is possible, for example, to close the lid component during the cooking process of the cooking vessel, so that the upper filling opening of the cooking vessel is partially blocked and the opening of the cover element, however, still allows, for example, the addition of ingredients. At the same time, the opening of the cover element can be dimensioned in such a way that a user cannot reach into the cooking vessel if it is closed by the lid component. This can increase the safety of the cooking vessel system. The locking device can advantageously have a diameter which is larger than the opening diameter of the opening. In particular, the diameter of the barrier may be less than 1 mm, preferably less than 0.6 mm, preferably less than 3 mm, greater than the diameter of the opening. This means that it may not be necessary to move the plug-in element far to reach the release position. This in turn can have a positive effect on the intuitive operation of the device by the user.

According to another aspect of the invention, a food processor is used to prepare foodstuff, whereby the food processor has an agitator for mixing ingredients. Furthermore, the agitator is arranged in a cooking vessel system according to claim 14. The agitator may preferably be located at the bottom or top of the cooking vessel system in a cooking vessel of the cooking vessel system. The agitator may enable automatic mixing of the ingredients, so that the agitator and the cooking vessel system, in particular an inventive device of the cooking vessel system, may enable a defined cooking result. At the same time, the inventive cooking vessel system can increase the safety of the agitator so that a user cannot easily reach into the agitator when the agitator is activated.

Thus, a system of cooking vessels and/or a food processor in conformity with the invention has the same advantages as those described in detail in relation to a device in conformity with the invention.

BRIEF DESCRIPTION OF THE DRAWINGS

Further measures to improve the invention result from the following description of some embodiments of the invention, which are shown schematically in the figures. All features and/or advantages resulting from the claims, the description or the drawings, including design details, spatial arrangements and process steps, may be essential to the invention both in themselves and in various combinations. It should be noted that the figures are only descriptive and are not intended to restrict the invention in any way. It is shown:

DETAILED DESCRIPTION OF SPECIFIC EMBODIMENTS

In the following figures, the identical reference signs are used for the same technical characteristics, even of different embodiments.

Figure 1:
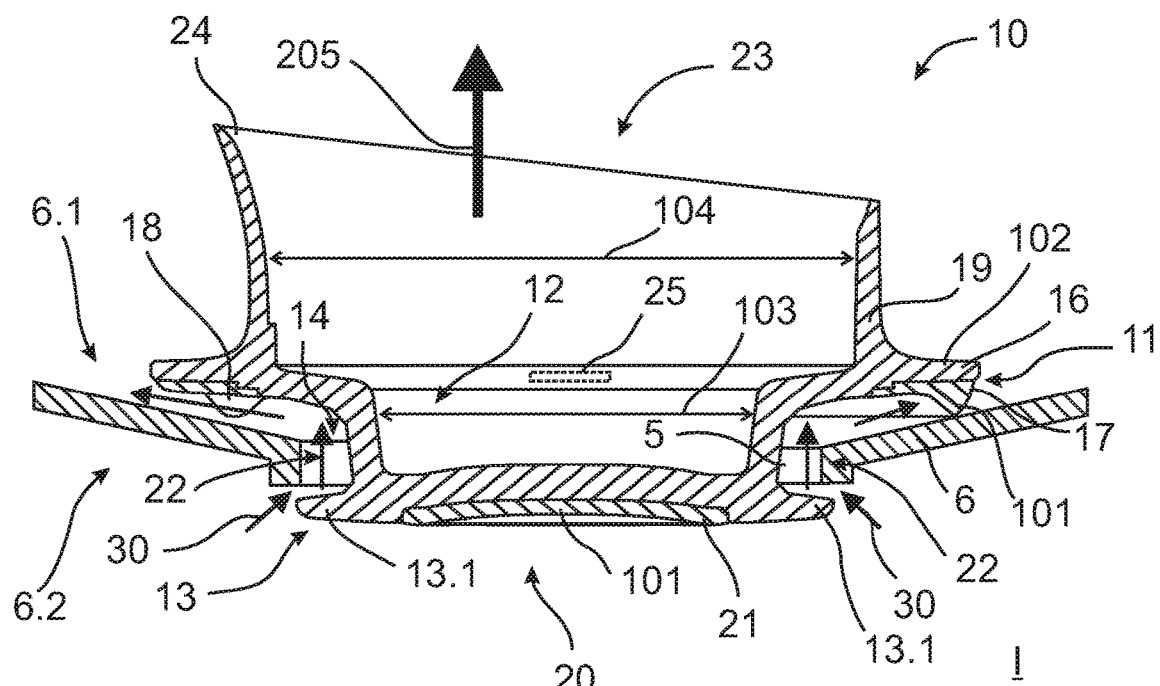
FIG. 1 is a cut, schematic view of the device according to the invention in a first embodiment.

FIG. 1 shows an inventive device 10 for at least partially closing an opening 5 of a cooking vessel 2, the device 10 being inserted into the opening 5 in the view shown in FIG. 1. The device 10 has a support element 11 which is placed on an opening edge 6 of the opening 5 of the cooking vessel 2. For this purpose, the support element 11 further has a stand-on-device 17 in the form of an at least partially circumferential rib which tapers in cross-section towards the stand-on surface by means of which the stand-on-device 17 rests on the opening edge 6. The support element 11 is also connected, in particular in one piece, to a plug-in element 12, the plug-in element 12 being inserted at least partially through the opening 5. In order to prevent the plug-in element 12 from being pulled out of the opening 5, the plug-in element 12 also has a locking means 13, which is shown in a locking position I. In the locking position I the locking means 13 interacts with the opening edge 6 in such a way that pulling out 205 of the plug-in element 12 out of the opening 5 is prevented. For this purpose, the support element 11 and the plug-in element 12 with the locking means 13 embrace the opening edge 6 at least partially, so that in the locking position I a positive locking of the locking means 13 with the opening edge 6 is produced. The support element 11 is brought to rest with the support means 17 on a first side 6.1 of the opening edge 6, while at least one blocking element 13.1, preferably two blocking elements 13.1, of the blocking means 13 is positioned in the form of a catch hook on a second side 6.2 of the opening edge 6. However, the locking means 13 has a clearance, i.e. a distance from the opening edge 6, so that the device 10 remains movable with respect to the cooking vessel 2. At least in some areas between the locking means 13 and the support element 11 there is also a free space 14 around the plug-in element 12 and in the locking position I between the plug-in element 12 and the opening edge 6. In this free space 14, steam 30 can escape from the inside of cooking vessel 2 to the outside, whereby steam 30 flows along a steam path. The steam path 22 runs through the free space 14 and below a collar 16 of the support element 11. In addition to the functionality of the steam path 22, the collar 16 also offers a splash guard so that when foodstuff is prepared in cooking vessel 2, it does not splash out of cooking vessel 2. Furthermore, the steam path 22 is formed by interruptions 18 which are provided in the stand-on-device 17, so that the support element 11 in the region of the interruptions 18 in the blocking position I has to the opening edge 6 or to a covering element 4 of the cooking vessel 2. This allows the steam 30 to escape in a defined way even when steam develops in cooking vessel 2. This can improve the cooking conditions in cooking vessel 2 so that they are also defined and also protect the surroundings of cooking vessel 2 from uncontrolled steam. Due to variations in pressure and/or temperature inside the cooking vessel 2, the device may be subject to 10 movements, in particular vibrations, even in the locking position I. In particular, the device 10 therefore comprises a first material 101 and a second material 102, preferably the first material 101 having a lower hardness than the second material 102. In particular, the stand-on-device 17 and/or an anti-slip 21 may comprise the first material 101 or consist of the first material 101. Preferably, the first material 101 can extend at least regionally, in particular as a connected region, over the collar 16 and a storage space 20 of the device 10. The anti-slip device 21 can preferably be arranged on the storage space 20, whereby the storage space 20 preferably forms a floor section of the plug-in element 12, which at least partially closes the plug-in element 12. The storage space 20, in particular the anti-slip 21, enables to safely park the device 10 in a defined position away from the cooking vessel 2. This favors the use of the device 10 as a measuring cup. For this purpose the device 10 further has a cavity 23 which is formed by a functional element 19 and the plug-in element 12. In particular, the cavity 23 can be formed by means of the second material 102 in order to ensure a high resistance to liquids inside the cavity 23. Function element 19 can also be used by a user to grip device 10 so that it can still be removed safely and conveniently from the opening edge 6 even if steam escapes below collar 16. Thus the cavity 23 can preferably be filled with ingredients, so that the device 10 can be removed from the cooking vessel 2 and thus the opening 5 can be opened. When opening 5 is enabled, it can be provided that the device 10 is filled with ingredients in accordance with a quantity specified, for example, by a recipe, and these ingredients can be added to the cooking vessel 2 through opening 5. The opening 5 is preferably dimensioned so that the user cannot reach into the cooking vessel 2 with his hand through opening 5. This can increase the safety of the cooking vessel 2, especially if it is used in a food processor 1 with a stirrer 7. In order to improve the measuring cup functionality, the device 10 may also have a level indicator 25, in particular in the cavity 23, whereby the level indicator 25 may advantageously include a marking and/or a paragraph. The label and/or paragraph allows a user to estimate a quantity of ingredients already filled into the cavity 23. The paragraph may, for example, be formed by the fact that the cavity 23 on the insert element 12 has a first diameter 103 and on the functional element 10 a second diameter 104, the first diameter 103 preferably being smaller than the second diameter 104. In order to be able to pour the ingredients in a comfortable manner from the device 10 or the cavity 23, respectively, the functional element 19 advantageously has a chute 24.

Figures 2A, 2B:
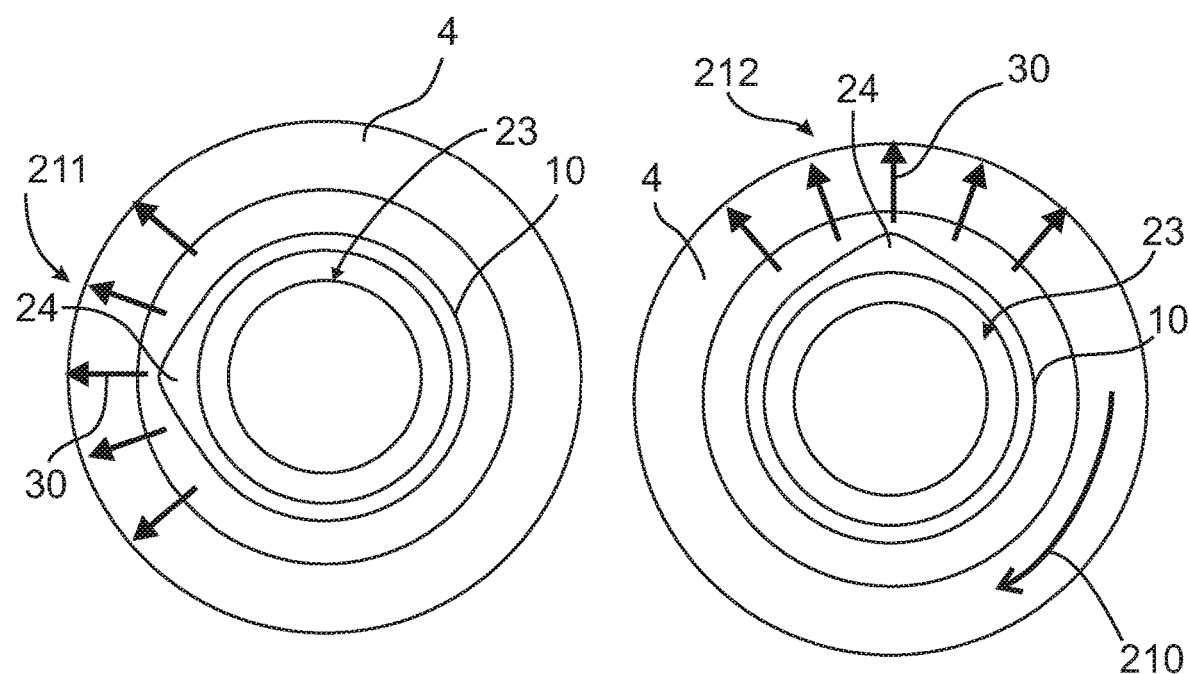
FIGS. 2a to 2c are schematic views of the possible steam output of the device of the first embodiment.
Figure 2C:
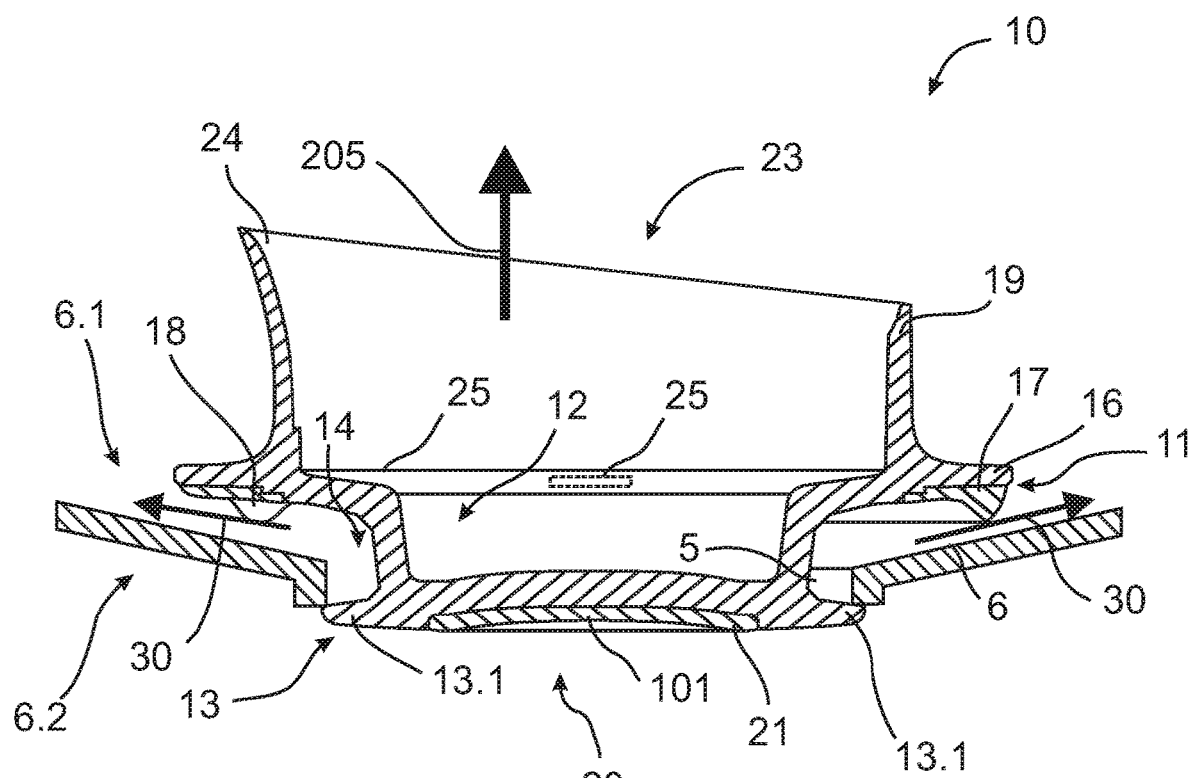

FIGS. 2a to 2c also show the inventive device 10 of the first embodiment in further views or positions. FIG. 2a shows a steam outlet of steam 30 in a defined first steam outlet direction 211 below the device 10 along a cover element 4 of the cooking vessel 2, wherein the cover element 4 closes a receiving space 3 of the cooking vessel 2 at least in regions. In particular, the cover element 4 is configured as a separate component from the receiving space 3. The cavity 23 is shown in the upwardly open position, whereby it is also conceivable that the cavity 23 is open in the locking position I to the receptacle 3 of the cooking vessel 2. FIG. 2b shows the invented device 10 after a rotary movement 210, whereby however the device 10 with the locking means 13 is still in the locking position I and thus fastened to the cover element 4. Due to the rotation of 210 by 90°, however, the first steam outlet direction 211 in a second steam outlet direction 212 has also been adjusted by 90°. This allows the user to set the steam outlet direction according to the orientation of the cooking vessel 2 by rotating 210 the device 10. Preferably the chute 24 is arranged to the interruptions 18 in such a way that the chute 24 is a visible indicator for the user of the steam outlet direction 211, 212. For this purpose, the chute 24 can preferably be arranged essentially in the middle of the interruptions 18. FIG. 2c further shows the device 10 of the first embodiment, where the locking means 13 rests against the opening edge 6 so that the stand-on-device 17 is spaced from the opening edge 6. This can, for example, represent a situation in which a high overpressure is present in the cooking vessel 2, through which the device 10 lifts off relative to the opening edge 6 and thereby releases an enlarged cross-section for the outlet of steam 30 below the stand-on-device 17 or the interruptions 18. At the same time, however, the blocking agent 13 can be used to ensure that the device 10 does not completely detach from the cover element 4 or from the cooking vessel 2.

Figure 3:
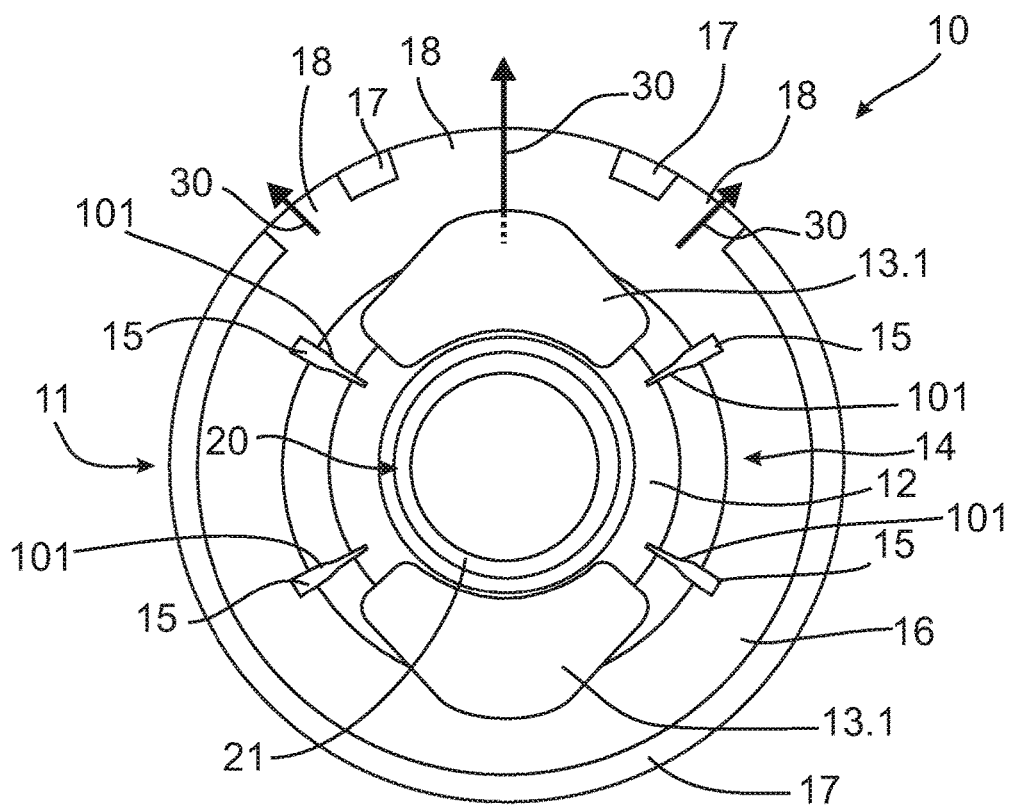
FIG. 3 is a schematic bottom view of the device of the first embodiment.

FIG. 3 also shows a plan view from below of the inventive device 10 of the first embodiment, whereby device 10 in the illustration of FIG. 3 is detached from cover element 4. Positioning means 15 in the form of four ribs are also shown. The positioning means 15 extend from the plug-in element 12 and from the support element 11 into the free space 14. If the plug-in element 12 is pushed through the opening 5, the positioning means 15 act with the opening edge 6 so that the plug-in element 12 is centered in the opening 5. In addition, the positioning means 15 preferably have the first material 101, so that the positioning means 15 are elastically deformable.

Figure 4A:
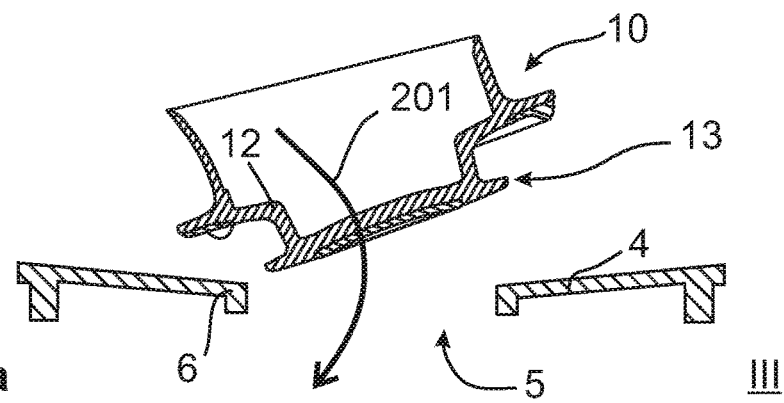
FIGS. 4a to 4e show a process of fixing or removing the device of the first embodiment to or from a cover element.
Figure 4B:
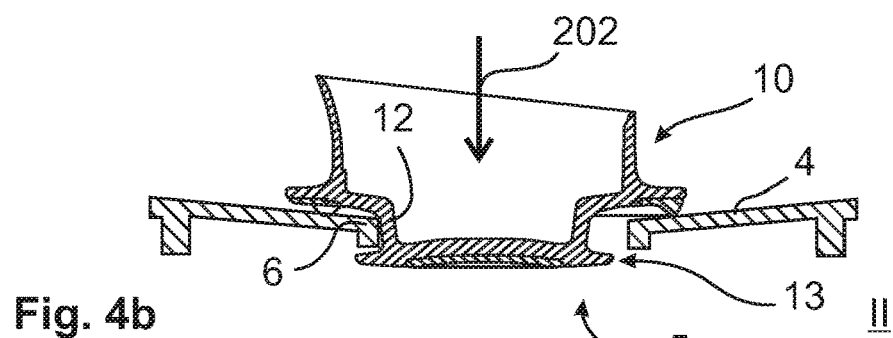
Figure 4C:
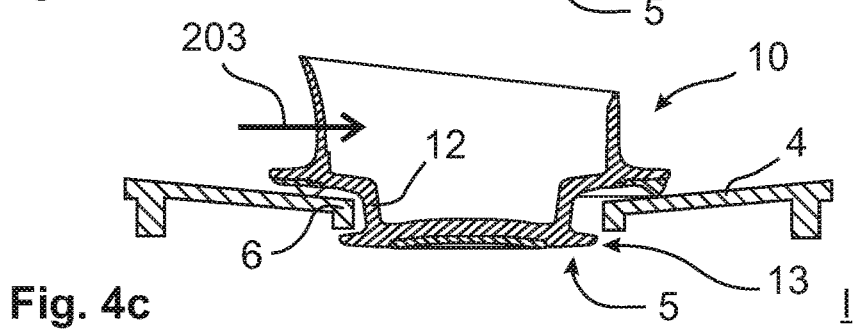
Figure 4D:
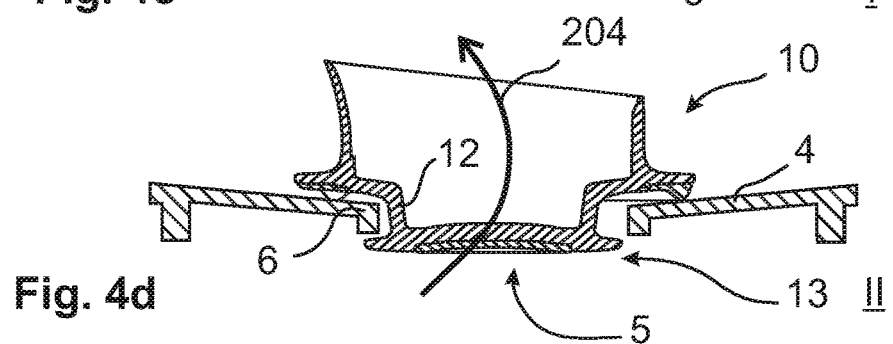
Figure 4E:
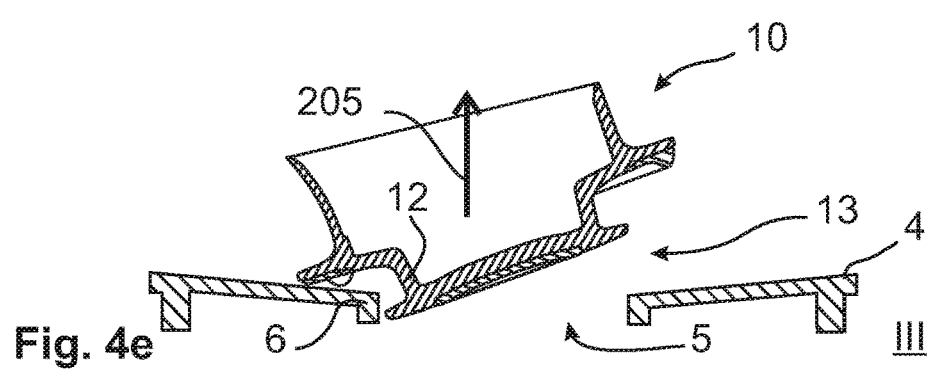

FIGS. 4a to 4c also show an insertion of the device 10 of the first embodiment into the opening 5 of the cover element 4. For this purpose, the device 10 is first brought into a tilting position III according to FIG. 4a, in which the locking means 13, which is set obliquely thereby, fits through the opening 5, in particular with at least one or with both locking elements 13.1. The device 10 can be inserted into the opening 5 under a first tilting movement 201. To position the support element 11 on the opening edge 6, insertion 202 of the plug-in element 12 through the opening 5 as shown in FIG. 4b. During the insertion 202 or during the first tilting movement 201, which can preferably be carried out in combination, two of the positioning means 15 also come into contact with the opening edge 6 and spring in elastically. In particular, the locking means 13 is in a release position II. As soon as the user releases the device 10, according to FIG. 4c, the positioning means 15 automatically centers 203 by springing it back into its original shape and/or position. The positioning means 15 opposite the spring-loaded positioning means 15 also ensure that a central position of the device 10 is maintained in relation to the opening 5. This corresponds to the locking position I, whereby the locking means 13 at least partially provides a positive locking with the opening edge 6. FIG. 4d shows the beginning of an opening movement of the device 10, wherein first the device 10 is moved opposite to centering 203 in such a way that the opening edge 6 penetrates into the free space 14 of the device 10 so that a release position II is reached in which the locking element 13 can be released from the opening edge 6. Then, by means of a second tilting movement 204, the locking device 13 can be moved through opening 5, so that finally, according to FIG. 4e, the device 10 can be pulled out 205 of opening 5. While pulling out 205, the device 10 is preferably in a tilting position III again.

Figure 5:
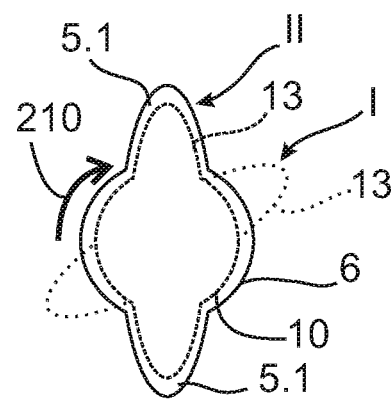
FIG. 5 is a schematic top view of a device according to the invention, according to another embodiment.

FIG. 5 also shows a device according to the invention 10 in a schematic plan view, which is at least partially inserted through an opening 5 of a cooking vessel 2. The device 10 has a locking means 13, which can be inserted straight through recesses 5.1 of the opening 5. A rotary movement 210 can then transfer the locking element 13 from a release position II to a locking position I (dashed), in which the locking means 13 produces a positive locking with an opening edge 6 of the opening 5 and the device 10 is thus secured in the opening 5.

Figure 6:
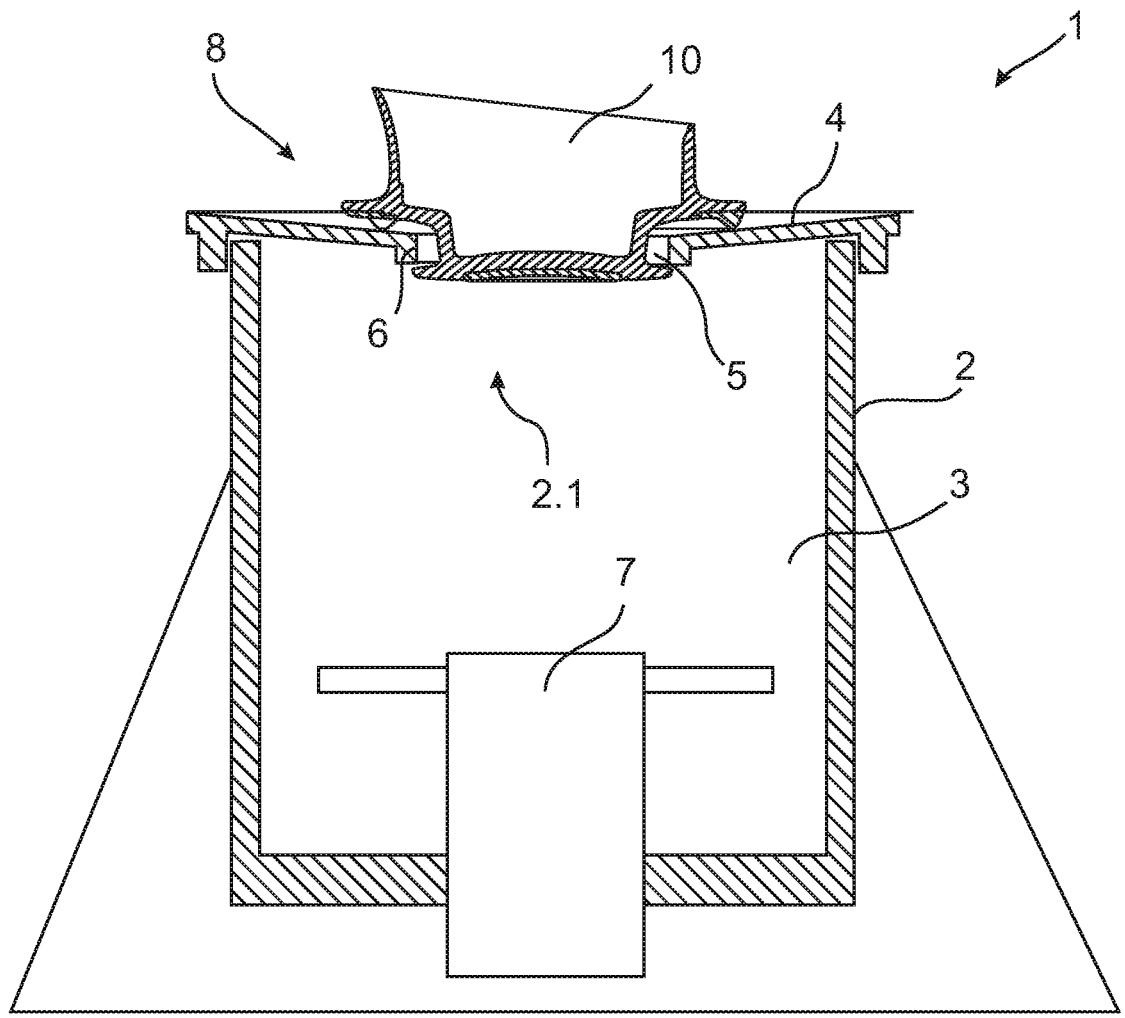
FIG. 6 is a schematic view of a kitchen machine according to the invention with a cooking vessel according to the invention in another embodiment.

FIG. 6 also shows a kitchen machine 1, which comprises a cooking vessel system 8, in another embodiment. An agitator 7 of the kitchen machine 1 for the automatic or semi-automatic preparation of foodstuff is arranged in the cooking vessel system 8, in particular on the bottom side of a cooking vessel 2. The cooking vessel 2 also has a receptacle 3 for receiving ingredients and/or foodstuff. Preferably the ingredients can be cooked in room 3. A cover element 4 is also provided which closes the cooking vessel 2 at least partially at a filling opening 2.1 of the cooking vessel 2. The cover element 4 can be configured in one piece with a wall of the receiving space 3 or as a separate component. In addition, the cover element 4 has an opening 5 through which the receiving space 3 can be filled with ingredients at least partially from the outside. To close the opening 5, a device according to the invention 10 is also provided, which closes the opening 5 at least partially in a blocking position I. The opening 5 is then closed by a device according to the invention.

Preferably, the device 10 can be configured according to one of the previous embodiments, especially preferred according to the first embodiment.

The above explanations of the forms of implementation describe the present invention exclusively within the framework of examples. Of course, individual features of the embodiments can be freely combined with each other without leaving the scope of the present invention, provided that this is technically feasible.

REFERENCE CHARACTER LIST

1 Kitchen machine
2 Cooking vessel
2.1 Filling opening
3 Recording room
4 Cover element
5 Opening
5.1 Recess
6 Opening edge
6.1 First side of 6
6.2 Second side of 6
7 Agitator
8 Cooking vessel system
10 Device
11 Support element
12 Plug-in element
13 Barrier
13.1 Barrier element
14 Free space
15 Positioning means
16 Collar
17 Rising funds
18 Interruption
19 Functional element
20 Storage space
21 Slip protection
22 Steam path
23 Cavity
24 Chute
25 Fill level indicator
30 Steam
101 First material
102 Second material
103 First diameter
104 Second diameter
201 first tilting movement
202 Insertion
203 Centering
204 Second tilting movement
205 Pulling out
210 Turning motion
211 Steam outlet direction
212 Second steam outlet direction
I Blocked position
II Release position
III Tilt position

What is claimed is:

1. A device for at least partially closing an opening of a cooking vessel, having
a support element which can be brought to rest on an opening edge of the opening of the cooking vessel, and
a plug-in element which can be inserted at least partially through the opening, wherein
the plug-in element has a locking means which can be brought into a locking position in which the locking means interacts with the opening edge, so that pulling out of the plug-in element is prevented, wherein a free space is formed in the locking position at least in regions around the plug-in element, as a result of which the plug-in element can be moved in the direction of the opening edge, so that the locking means can be brought into a release position in which the locking means can be released at least partially from the opening edge.

2. The device according to claim 1, wherein
in the locking position, the support element can be brought to rest on a first side of the opening edge and, in the locking position, the locking means can be positioned on a second side of the opening edge, so that the plug element with the locking means and the support element at least partially engage around the opening edge.

3. The device according to claim 1, wherein
at least one positioning means, by means of which the plug-in element can be centered in the opening, is provided on the plug-in element.

4. The device according to claim 1, wherein
the support element has a collar which encloses the plug-in element completely.

5. The device according to claim 1, wherein
the support element has a stand-on-device by means of which the support element can be brought to rest on the opening edge the support element (11) being spaced apart from the opening edge (6) in the region of the interruption (18) when resting on the opening edge (6).

6. The device according to claim 1, wherein
a functional element extends from the support element and is accessible by a user when the support element rests on the opening edge.

7. The device according to claim 1, wherein
a first material and a second material are provided.

8. The device according to claim 1, wherein
a support surface is provided by means of which the device can be set down away from the cooking vessel.

9. The device according to claim 1, wherein
when the support element rests on the opening edge, a steam path can be configured at least by the at least one positioning means or by the interruption with the opening edge.

10. The device according to claim 1, wherein
at least the plug-in element or the functional element form a cavity which can be filled with an ingredient.

11. The device according to claim 10, wherein
the cavity projects at least partially into the plug-in element.

12. The device according to claim 1, wherein
the device is configured as a measuring cup.

13. The device according to claim 7, wherein at least the first material having a lower hardness than the second material or the support element having the first material and a functional element having the second material.

14. The device according to claim 8, wherein at least the plug-in element having the support surface or the support surface having an anti-slip device.

15. The device according to claim 9, wherein
at least the plug-in element or the collar can be arranged at a distance from the opening edge at least by the at least one positioning means or a stand-on-device.

16. The device according to claim 10, wherein at least the cavity having a chute through which the ingredient can be poured out of the cavity or the cavity having at least one filling level indicator.

17. The device according to claim 11, wherein
the cavity having a first diameter on the plug-in element and a second diameter on a functional element, the first diameter being smaller than the second diameter.

18. A cooking vessel system comprising:
a cooking vessel to hold the ingredients,
wherein a device for at least partially closing an opening of a cooking vessel is provided, having a support element which can be brought to rest on an opening edge of the opening of the cooking vessel, and a plug-in element which can be inserted at least partially through the opening, wherein the plug-in element has a locking means which can be brought into a locking position in which the locking means interacts with the opening edge, so that pulling out of the plug-in element is prevented, wherein a free space is formed in the locking position at least in regions around the plug-in element, as a result of which the plug-in element can be moved in the direction of the opening edge, so that the locking means can be brought into a release position in which the locking means can be released at least partially from the opening edge, through which device an opening of the cooking vessel can be at least partially closed in a blocking position.

19. A food processor for preparing foodstuff comprising:
an agitator for mixing ingredients,
wherein the agitator is arranged in a cooking vessel system comprising a cooking vessel to hold the ingredients,
wherein a device for at least partially closing an opening of a cooking vessel is provided, having a support element which can be brought to rest on an opening edge of the opening of the cooking vessel, and a plug-in element which can be inserted at least partially through the opening, wherein the plug-in element has a locking means which can be brought into a locking position in which the locking means interacts with the opening edge, so that pulling out of the plug-in element is prevented, wherein a free space is formed in the locking position at least in regions around the plug-in element, as a result of which the plug-in element can be moved in the direction of the opening edge, so that the locking means can be brought into a release position in which the locking means can be released at least partially from the opening edge, through which device an opening of the cooking vessel can be at least partially closed in a blocking position.

* * * * *